May 6, 1958 A. VAUGOYEAU 2,833,561
SEMI-TRAILER COUPLING PERMITTING LATERAL TILTING OF THE TRAILER
Filed Feb. 27, 1956 3 Sheets-Sheet 2

INVENTOR
ALEXANDRE VAUGOYEAU
BY
Chatwin & Company
ATTORNEYS

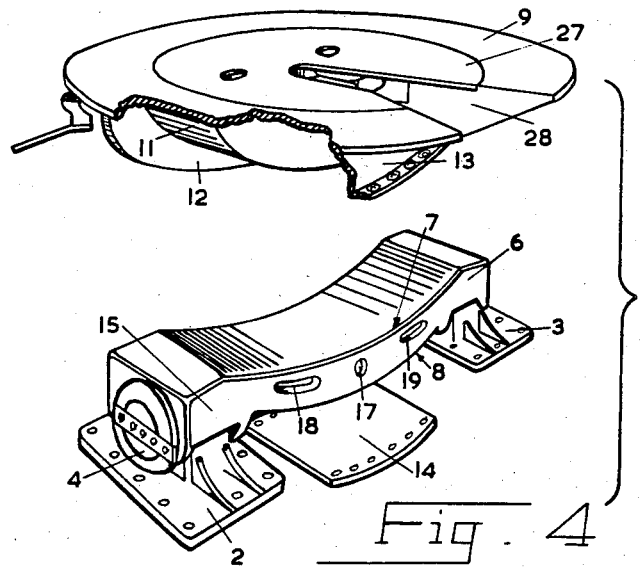
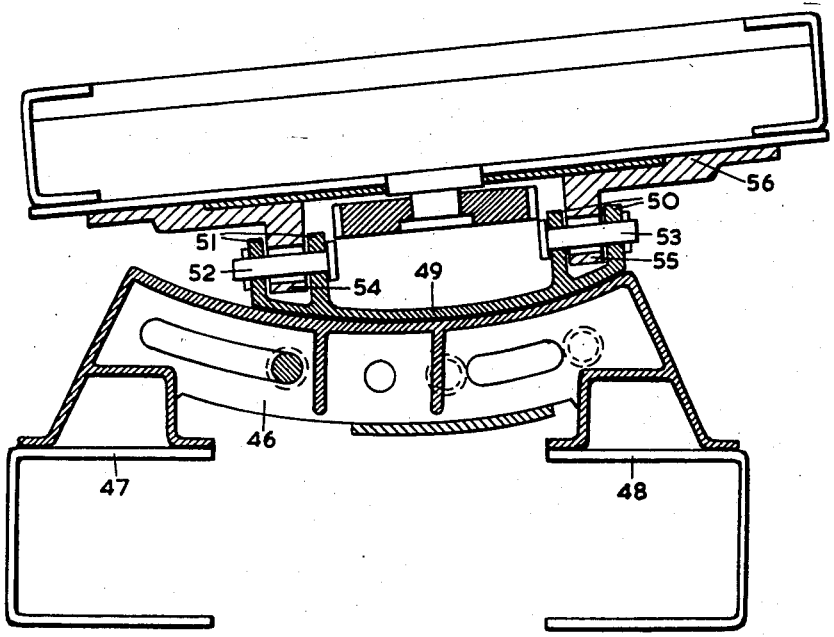

United States Patent Office 2,833,561
Patented May 6, 1958

2,833,561

SEMI-TRAILER COUPLING PERMITTING LATERAL TILTING OF THE TRAILER

Alexandre Vaugoyeau, Marseille, France

Application February 27, 1956, Serial No. 567,925

Claims priority, application France March 3, 1955

1 Claim. (Cl. 280—438)

This invention relates to a hitch for connecting a semi-trailer vehicle to a towing vehicle, its object being to provide an improved construction wherein any movement of the trailer, out of dead level, with respect to the towing vehicle and about a horizontal axis aligned fore and aft of the towing vehicle, gives rise to a restoring force tending to keep the trailer upright.

According to the present invention, a hitch for connecting a semi-trailer vehicle to a towing vehicle comprises a cradle on the towing vehicle having an upper concave part-cylindrical bearing surface and a concentric lower convex part-cylindrical bearing surface, the cylinder axis of said cradle bearing surfaces being aligned fore and aft of the towing vehicle and positioned above the cradle, a coupling platform having a part-cylindrical under bearing surface of corresponding radius seated on the upper concave bearing surface of the cradle, abutments on the platform depending from the ends thereof to engage against the ends of the cradle and prevent relative movement of the cradle and platform in the direction parallel to the axis of the part-cylindrical surfaces, a tie member secured to the abutments and engaged as a sliding fit against the lower convex bearing surface of the cradle to prevent relative radial parting of the cradle and platform, a king-pin on the semi-trailer, and releasable coupling means on the platform to receive and retain the king-pin whilst permitting it to rotate.

Figure 1:
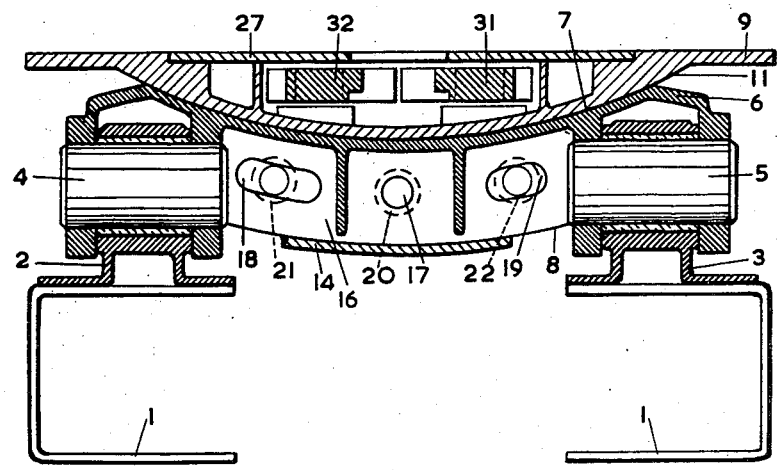
Figure 2:
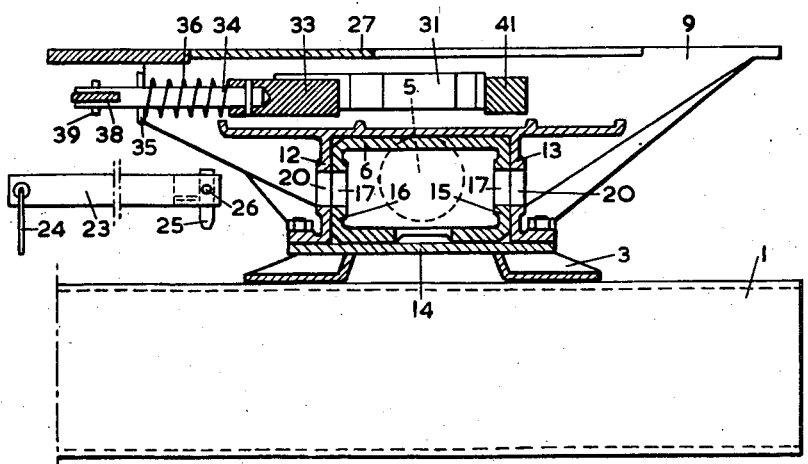
Figure 3:
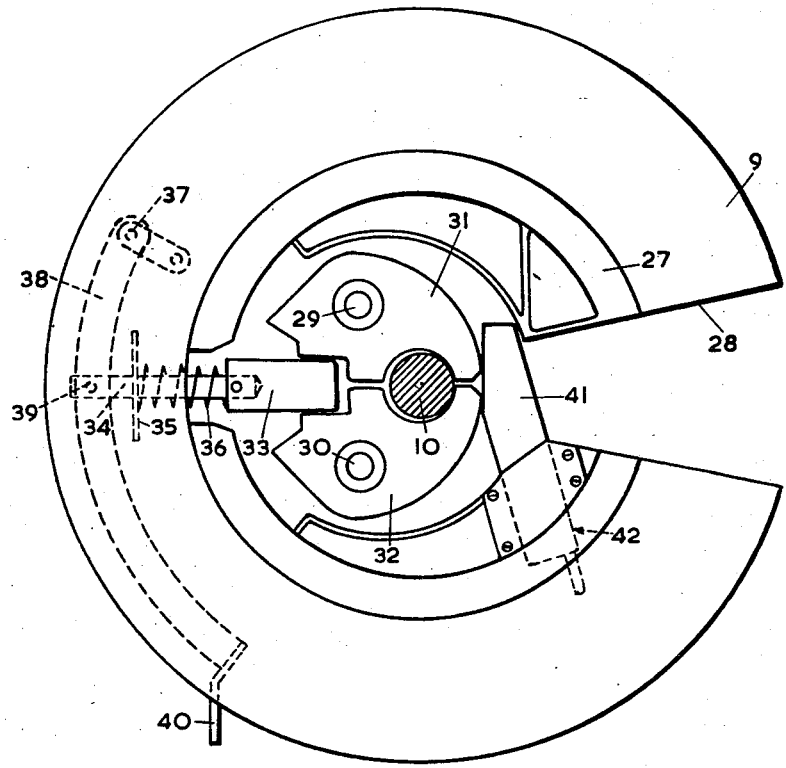
Figure 5:
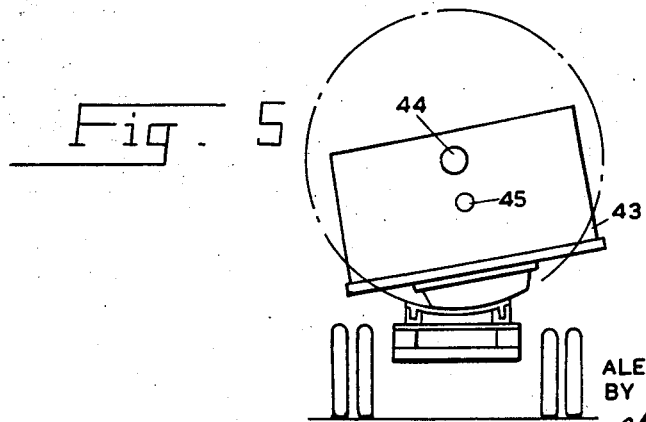

An embodiment of hitch for a semi-trailer vehicle, in accordance with the invention, is hereinafter particularly described with reference to the accompanying drawings, wherein: Fig. 1 is a transverse vertical section through the hitch; Fig. 2 is a longitudinal vertical section therethrough; Fig. 3 is a plan view thereof; Fig. 4 is a perspective elevation of parts of the hitch in separated condition, to emphasize the cylindrical nature of the bearing surfaces; Fig. 5 is a diagrammatic representation of the action of the hitch when the semi-trailer vehicle is moved at an angle, about its longitudinal axis, with respect to the towing vehicle; Fig. 6 is a transverse vertical section of a modification of the hitch.

Referring to Figs. 1 to 4, the towing vehicle has longitudinal girders 1 at each side on which are mounted bearing members 2, 3 receiving bearing pins 4, 5 serving to support a cradle 6 and permit it to rock about a horizontal axis disposed transversely of the towing vehicle. The upper surface 7 of the cradle is concave and part-cylindrical, the axis of the cylinder being aligned fore and aft of the vehicle. The lower bearing surface 8 is convex and also part-cylindrical with the same axis as the upper surface.

Means for coupling the semi-trailer consist of a coupling platform 9 adapted to receive the usual depending king-pin 10 of the semi-trailer in a manner which will be explained hereinafter. The coupling platform 9 seats by its part-cylindrical convex bearing surface 11 on the bearing surface 7 of the cradle. The platform 9 also has two depending walls 12, 13 which abut against the ends of the cradle 6 and prevent relative fore and aft movement of the platform with respect to the cradle i. e. parallel to the axis of the part-cylindrical surfaces, whilst still permitting the platform to slide in an arcuate transverse movement. To the lower ends of the depending walls 12, 13 is bolted a tie member 14 which rides against the convex under bearing surface 8 of the cradle 6 and prevents separation of the platform and cradle normal to their bearing surfaces. The end walls 15, 16 of the cradle 6 have each a central round hole 17 and symmetrically placed lateral slotted holes 18, 19. The depending walls 12, 13 of the platform have central round holes 20 permitting the introduction of a rod through the holes 20 and through the holes 17 of the cradle to lock the platform to the cradle in the symmetrical centralised position of Fig. 1. Other rods may be introduced through lateral holes 21, 22 of the platform and through the corresponding slotted holes 18, 19 of the cradle to permit limitation of the amount of relative sliding movement of the platform with respect to the cradle. It will be seen that the slotted hole 19 is shorter than the slotted hole 18, so that by placing a rod in one or the other, a different amount of permitted movement is obtained. A rod 23 suitable for placing through the selected holes of the platform and cradle is illustrated in Fig. 2 to the left of the sectional part of the figure. This rod has a handle 24 at one and a turn-buckle 25 at the other end rotatable about a pivot 26. In use, the turn-buckle 25 is aligned with the axis of the rod to permit introduction of the rod through the holes, whereafter the turn-buckle is rotated into the position illustrated, in which it prevents the rod from coming unintentionally out of the holes.

The means for coupling the trailer vehicle by its king-pin 10 to the platform are as follows. The platform has the usual circular plate 27 with a V-shaped opening 28 to guide the king-pin to its centre, as the trailer and towing vehicle are moved towards each other. Below the plate 27 is arranged the mechanism seen in plan view in Fig. 3. This consists of a pair of pivot pins 29, 30 on which are pivotable two jaws 31, 32 having corresponding semi-circular recesses which, when the jaws are in locking position as shown in Fig. 3, form a circular seating for the king-pin 10 and hold the latter firmly but rotatably in position therein. A locking member for the two jaws 31, 32 is constituted by a block or wedge 33 mounted on the end of a shaft 34 slidable through a bracket 35, a spring 36 serving to urge the block 33 into the locking position between the jaws. On the underside of the platform 9 is secured a pivot 37 for a hand lever 38 coupled to the shaft 34 by a pin 39, said lever protruding from beneath the platform as a handle 40 which can be moved manually to the left in Fig. 3 to withdraw the block 33 from between the jaws when it is desired to allow the jaws to pivot and release the king-pin. As a further locking means for the two jaws 31, 32 there is provided a bar 41 slidable longitudinally in a housing 42 secured to the underside of the plate, this bar abutting against the noses of the two jaws, when the latter are in the closed position illustrated, and prohibiting them from pivoting out of locking position even if the block 33 should fail for any reason.

With this construction of hitch, the trailer can move about a vertical axis with respect to the towing vehicle by rotation of the king-pin within the jaws 31, 32. Movement of the trailer about a horizontal transverse axis is permitted by tilting of the cradle 6 on its two bearing pins 4, 5 with respect to the chassis of the towing vehicle. Movement of the trailer, with respect to the towing vehicle, about a horizontal longitudinal axis is permitted by sliding of the platform 9 on the cradle 6 about a horizontal axis disposed at a considerable height above the bearing surfaces. Because this axis is above the centre of gravity of the trailer, the trailer tends to right itself automatically when it moves about said axis due to an uneven road surface or any other cause. This will be apparent from Fig. 5 wherein the trailer vehicle 43 is shown as tilted about the axis 44, and 45 represents the centre of gravity of the trailer.

In the modification shown in Fig. 6, the cradle 46 is shown directly mounted on the longitudinal chassis girders 47, 48 of the towing vehicle. The cradle has similar upper and lower part-cylindrical bearing surfaces with which are engaged the corresponding bearing surfaces of a bearing member 49. The latter has lugs 50, 51 receiving pivot pins 52, 53 serving to support lugs 54, 55 at the underside of a plate 56. In this modification, the means for pivoting of the trailer about a horizontal transverse axis are disposed between the plate and the bearing member 49, instead of between the cradle 6 and the chassis of the towing vehicle, as in Figs. 1 to 4.

I claim:

A hitch for connecting a semi-trailer vehicle to a towing vehicle, comprising a cradle on the towing vehicle having an upper concave part-cylindrical bearing surface and a concentric lower convex part-cylindrical bearing surface, the cylinder axis of said cradle bearing surfaces being aligned fore and aft of the towing vehicle and positioned above the cradle, a coupling platform having a part-cylindrical under bearing surface of corresponding radius seated on the upper concave bearing surface of the cradle, abutments on the platform depending from the ends thereof to engage against the ends of the cradle and prevent relative movement of the cradle and platform in the direction parallel to the axis of the part-cylindrical surfaces, a tie member secured to the abutments and engaged as a sliding fit against the lower convex bearing surface of the cradle to prevent relative radial parting of the cradle and platform, a king-pin on the semi-trailer, and releasable coupling means on the platform to receive and retain the king-pin whilst permitting it to rotate.

References Cited in the file of this patent
UNITED STATES PATENTS

| | | |
|---|---|---|
| 1,374,352 | Borst, Jr. | Apr. 12, 1921 |
| 1,479,796 | Endebrock | Jan. 8, 1924 |
| 2,053,812 | Bradshaw | Sept. 8, 1936 |
| 2,196,537 | Sherman | Apr. 9, 1940 |
| 2,400,738 | Brown | May 21, 1946 |
| 2,468,705 | Price | Apr. 26, 1949 |
| 2,519,090 | Winn | Aug. 15, 1950 |
| 2,673,094 | Martin | Mar. 23, 1954 |
| 2,726,879 | Vaillant | Dec. 13, 1955 |